US012802060B2

(12) United States Patent
Edwards et al.

(10) Patent No.: US 12,802,060 B2
(45) Date of Patent: Nov. 17, 2026

(54) INTELLIGENT SELECTION OF A MEDIUM AT A USER INTERFACE

(71) Applicant: Capital One Services, LLC, McLean, VA (US)

(72) Inventors: Joshua Edwards, Philadelphia, PA (US); Michael Mossoba, Great Falls, VA (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 127 days.

(21) Appl. No.: 18/500,893

(22) Filed: Nov. 2, 2023

(65) Prior Publication Data

US 2025/0148453 A1 May 8, 2025

(51) Int. Cl.
*G06Q 20/34* (2012.01)
*G06Q 20/10* (2012.01)
(Continued)

(52) U.S. Cl.
CPC ..... *G06Q 20/3555* (2013.01); *G06Q 20/1085* (2013.01); *G06Q 20/20* (2013.01);
(Continued)

(58) Field of Classification Search
None
See application file for complete search history.

(56) References Cited

U.S. PATENT DOCUMENTS 7,701,344 B2 * 4/2010 Mattice .................. G07F 17/32 273/237
8,116,734 B2 * 2/2012 Vawter .................. G06Q 20/10 455/406
(Continued)

FOREIGN PATENT DOCUMENTS

CA 2613338 C * 5/2014 ......... G07F 17/3237
CA 3038728 A1 * 4/2018 ......... G06Q 20/4016
(Continued)

OTHER PUBLICATIONS

Rodrigues H, José R, Coelho A, Melro A, Ferreira MC, Falcão e Cunha J, Monteiro MP, Ribeiro C. MobiPag: integrated mobile payment, ticketing and couponing solution based on NFC. Sensors (Basel). Jul. 24, 2014;14(8):13389-415. https://pmc.ncbi.nlm.nih.gov/articles/PMC4179034/ (Year: 2014).*
(Continued)

*Primary Examiner* — El Mehdi Oussir
(74) *Attorney, Agent, or Firm* — Harrity & Harrity, LLP

(57) ABSTRACT

In some implementations, an intelligent medium selection device may receive, via a user interface, multiple wireless signals, wherein each wireless signal, of the multiple wireless signals, corresponds to a respective medium, of multiple mediums being presented at the user interface. The intelligent medium selection device may determine whether at least one medium, of the multiple mediums, is associated with a medium order priority profile. The intelligent medium selection device may determine, based on determining whether that at least one medium is associated with the
(Continued)

medium order priority profile, a selected medium, of the multiple mediums, to be used for an electronic exchange of information. The intelligent medium selection device may execute the electronic exchange of information using the selected medium.

20 Claims, 6 Drawing Sheets

(51) Int. Cl.

| | |
|---|---|
| ***G06Q 20/20*** | (2012.01) |
| ***G06Q 20/38*** | (2012.01) |
| ***G06Q 20/40*** | (2012.01) |

(52) U.S. Cl.
CPC ..... *G06Q 20/3827* (2013.01); *G06Q 20/4014* (2013.01); *G06Q 2220/00* (2013.01)

(56) References Cited

U.S. PATENT DOCUMENTS

| | | | | |
|---|---|---|---|---|
| 9,043,237 | B2 * | 5/2015 | McCarthy | G06Q 20/02 |
| | | | | 713/184 |
| 9,892,293 | B1 * | 2/2018 | Wade | G06F 21/86 |
| 10,102,514 | B2 * | 10/2018 | Laracey | G06Q 20/3276 |
| 10,430,556 | B2 * | 10/2019 | McCauley | H04W 4/023 |
| 11,188,908 | B2 * | 11/2021 | Locke | G06Q 20/341 |
| 11,257,072 | B1 * | 2/2022 | Aument | G06Q 20/202 |
| 11,423,384 | B1 * | 8/2022 | Philbrick | G06Q 10/10 |
| 11,593,793 | B2 * | 2/2023 | Zimmerman | G06Q 20/407 |
| 11,861,626 | B2 * | 1/2024 | Walters | G06Q 20/204 |
| 12,026,691 | B2 * | 7/2024 | Chatterjee | H04W 4/023 |
| 12,183,108 | B2 * | 12/2024 | Perezleon | G06Q 20/341 |
| 2017/0006434 | A1 * | 1/2017 | Howe | G06Q 20/20 |
| 2017/0124511 | A1 * | 5/2017 | Mueller | G06Q 10/0837 |
| 2018/0032997 | A1 * | 2/2018 | Gordon | G06Q 30/0269 |
| 2018/0227735 | A1 * | 8/2018 | Gold | G06Q 30/02 |
| 2018/0350144 | A1 * | 12/2018 | Rathod | A63F 13/213 |
| 2019/0095898 | A1 * | 3/2019 | Bhatia | G06Q 20/227 |
| 2019/0287108 | A1 * | 9/2019 | White | G06Q 20/102 |
| 2019/0347431 | A1 * | 11/2019 | Nair | H04L 63/107 |
| 2020/0387887 | A1 * | 12/2020 | Rathod | G06Q 20/3224 |
| 2022/0067698 | A1 * | 3/2022 | Griffin | G06Q 20/4014 |
| 2022/0138755 | A1 * | 5/2022 | Aument | G06Q 20/204 |
| | | | | 726/26 |
| 2022/0223019 | A1 * | 7/2022 | Shakedd | G06Q 30/06 |
| 2022/0383325 | A1 * | 12/2022 | Hoffman | G06Q 20/4018 |
| 2023/0137137 | A1 * | 5/2023 | Nowak | G06Q 20/208 |
| | | | | 705/23 |
| 2023/0153873 | A1 * | 5/2023 | Jiang | G06Q 30/04 |
| | | | | 705/34 |
| 2023/0274252 | A1 * | 8/2023 | Caceres | G06Q 20/108 |
| | | | | 705/42 |
| 2024/0029052 | A1 * | 1/2024 | Pinnamaneni | G06Q 20/3278 |
| 2024/0086932 | A1 * | 3/2024 | Dimarco | G06Q 20/0855 |
| 2024/0163676 | A1 * | 5/2024 | Han | H04W 4/021 |

FOREIGN PATENT DOCUMENTS

| | | | | | |
|---|---|---|---|---|---|
| CN | 1939009 | A | * | 3/2007 | |
| CN | 101819665 | A | * | 9/2010 | H04L 12/1475 |
| CN | 102822855 | A | * | 12/2012 | G06Q 30/0224 |
| CN | 103959863 | A | * | 7/2014 | H04L 12/5692 |
| CN | 105247930 | A | * | 1/2016 | H04L 12/145 |
| CN | 102822855 | B | * | 11/2016 | |
| CN | 107370539 | A | * | 11/2017 | H04N 23/73 |
| CN | 108476228 | A | * | 8/2018 | H04L 63/107 |
| CN | 108604129 | A | * | 9/2018 | G06T 19/00 |
| CN | 109314545 | A | * | 2/2019 | H04B 7/0602 |
| CN | 109478284 | A | * | 3/2019 | G06Q 30/0267 |
| CN | 109788475 | A | * | 5/2019 | H04W 72/542 |
| CN | 107431895 | B | * | 6/2020 | H04L 67/01 |
| CN | 112805735 | A | * | 5/2021 | G06F 21/35 |
| CN | 114792012 | A | * | 7/2022 | G06F 21/6245 |
| CN | 114880065 | A | * | 8/2022 | G06F 9/451 |
| CN | 115412184 | A | * | 11/2022 | H04B 17/27 |
| CN | 116681436 | A | * | 9/2023 | G06Q 20/325 |
| CN | 116964606 | A | * | 10/2023 | |
| CN | 113673976 | B | * | 6/2024 | G06F 21/6245 |
| JP | 2024021088 | A | * | 2/2024 | G01S 13/66 |
| JP | 7640955 | B2 | * | 3/2025 | G06Q 40/03 |
| KR | 102397906 | B1 | * | 5/2022 | H04W 4/80 |
| WO | WO-2014172320 | A1 | * | 10/2014 | G01C 21/26 |
| WO | WO-2017222837 | A1 | * | 12/2017 | G01S 5/0295 |
| WO | WO-2018063812 | A1 | * | 4/2018 | G06Q 20/20 |
| WO | WO-2018111601 | A1 | * | 6/2018 | H04L 63/1416 |
| WO | WO-2020125839 | A1 | * | 6/2020 | H04L 9/50 |
| WO | WO-2021217168 | A1 | * | 10/2021 | G06K 19/07709 |

OTHER PUBLICATIONS

Yohan A, Lo NW, Winata D. An Indoor Positioning-Based Mobile Payment System Using Bluetooth Low Energy Technology. Sensors (Basel). 2018, https://pmc.ncbi.nlm.nih.gov/articles/PMC5948557/ (Year: 2018).*

A. Almuhammadi, "An Overview of Mobile Payments, Fintech, and Digital Wallet in Saudi Arabia," 2020 7th International Conference on Computing for Sustainable Global Development (INDIACom), New Delhi, India; https://ieeexplore.ieee.org/document/9083726?source=IQplus (Year: 2020).*

P. Urien and S. Piramuthu, "LLCPS and SISO: A TLS-based framework with RFID for NFC P2P retail transaction processing," 2013 IEEE International Conference on RFID (RFID), Orlando, FL, USA, 2013, pp. 152-159, doi: 10.1109/RFID. https://ieeexplore.ieee.org/document/6548149?source=IQplus (Year: 2013).*

* cited by examiner

INTELLIGENT SELECTION OF A MEDIUM AT A USER INTERFACE

BACKGROUND

Near field communication (NFC) is a set of communication protocols for communication between two electronic devices over a distance, such as four centimeters or less. NFC enables a contactless exchange of data over short distances. Two NFC-capable devices are connected via a point-to-point contact over a distance. This connection can be used to exchange data between the devices. Some communication protocols, such as NFC, may be used for completing an electronic exchange of information associated with financial information, such as an electronic exchange of information associated with an automated teller machine (ATM), a point of sale (POS) terminal at a retail store, or a similar terminal. A user may present a medium (e.g., a card, an ATM card, a payment card such as a credit card or a debit card, a gift card, a transaction card, or a similar medium) at a terminal, and the terminal may wirelessly read account information and/or related information from the medium in order to execute a transaction associated with the terminal (e.g., a deposit or withdrawal of funds at an ATM, a purchase or a refund at a POS terminal, and/or a similar transaction).

SUMMARY

Some implementations described herein relate to a system for processing multiple mediums at a user interface. The system may include one or more memories and one or more processors communicatively coupled to the one or more memories. The one or more processors may be configured to receive, at the user interface via a wireless technology, multiple wireless signals, wherein each wireless signal, of the multiple wireless signals, corresponds to a respective medium, of multiple mediums being presented at the user interface. The one or more processors may be configured to determine that at least one medium, of the multiple mediums, is associated with a medium order priority profile. The one or more processors may be configured to determine, based on the medium order priority profile, a selected medium, of the multiple mediums, to be used for an electronic exchange of information. The one or more processors may be configured to execute the electronic exchange of information using the selected medium.

Some implementations described herein relate to a method for intelligently selecting a medium at a user interface. The method may include receiving, by an intelligent medium selection device via a wireless technology, multiple wireless signals, wherein each wireless signal, of the multiple wireless signals, corresponds to a respective medium, of multiple mediums being presented at the user interface. The method may include determining, by the intelligent medium selection device, whether at least one medium, of the multiple mediums, is associated with a medium order priority profile. The method may include determining, based on determining whether that at least one medium is associated with the medium order priority profile, a selected medium, of the multiple mediums, to be used for an electronic exchange of information. The method may include executing, by the intelligent medium selection device, the electronic exchange of information using the selected medium.

Some implementations described herein relate to a non-transitory computer-readable medium that stores a set of instructions. The set of instructions, when executed by one or more processors of a wireless terminal, may cause the wireless terminal to receive multiple wireless signals, wherein each wireless signal, of the multiple wireless signals, corresponds to a respective transaction card, of multiple transaction cards being presented at the wireless terminal. The set of instructions, when executed by one or more processors of the wireless terminal, may cause the wireless terminal to determine whether at least one transaction card, of the multiple transaction cards, is associated with a card order priority profile. The set of instructions, when executed by one or more processors of the wireless terminal, may cause the wireless terminal to determine, based on determining whether that at least one transaction card is associated with the card order priority profile, a selected transaction card, of the multiple transaction cards, to be used for a transaction. The set of instructions, when executed by one or more processors of the wireless terminal, may cause the wireless terminal to execute the transaction using the selected transaction card.

DETAILED DESCRIPTION

Figure 1A:
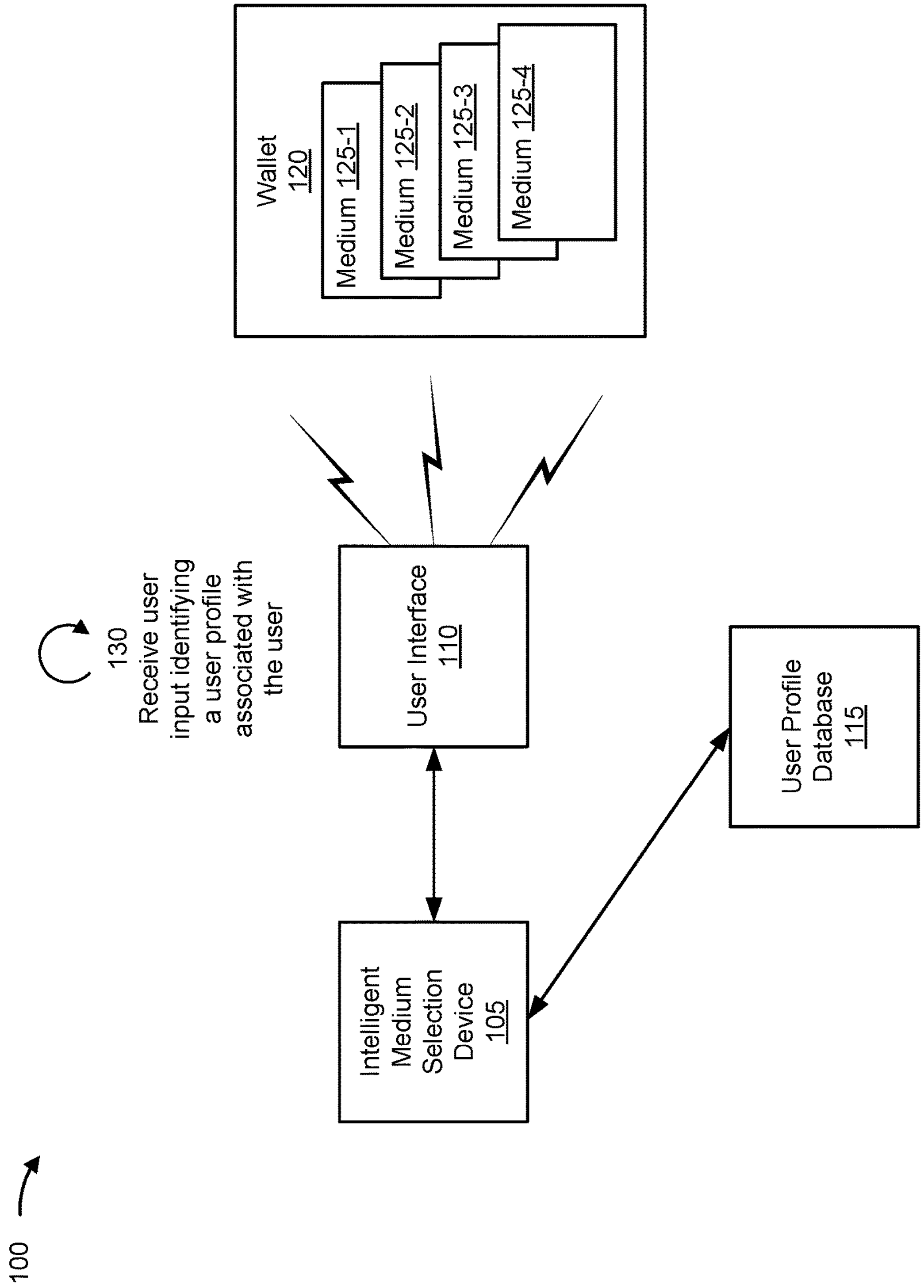
FIGS. 1A-1C are diagrams of an example associated with intelligent selection of a medium at a user interface, in accordance with some embodiments of the present disclosure.

The following detailed description of example implementations refers to the accompanying drawings. The same reference numbers in different drawings may identify the same or similar elements.

Some implementations described herein enable an intelligent selection of a medium that is used for an electronic exchange of information, resulting in an appropriate and/or preferred medium, out of multiple candidate mediums that are presented at a wireless terminal, to be used for successful completion of the electronic exchange of information. In that regard, some implementations described herein may conserve power, computing, and network resources that are otherwise associated with failed electronic exchanges of information and/or redundant electronic exchange of information.

Certain electronic exchanges of information may be facilitated by using a medium storing information associated with the electronic exchange of information. For example, to complete an electronic exchange of information, a user may present a medium (e.g., a card, a token, an identifier, an identity, an account number, and/or a similar medium) to facilitate the electronic exchange of information. More particularly, when withdrawing or depositing funds at an ATM, a user may present an ATM card (as one example of a medium) storing bank account information and/or similar information, and the ATM may use the bank account information and/or similar information to complete the transaction. Similarly, making a purchase at a retail store or other entity, a user may present, at a POS terminal, a payment card (e.g., a debit card, a credit card, a gift card, or a similar card, as another example of a medium) storing payment information, such as an indication of a financial institution associated with the user and/or the payment card, an account number associated with the user and/or the payment card, and/or similar information, and the POS terminal may use the payment information to complete the sale.

In some examples, a medium (e.g., a card) may store information on a magnetic strip, such that, when the magnetic strip is swiped by a reader (e.g., an ATM terminal, a POS terminal, or the like), the account information or similar information may be accessed by the reader. Additionally, or alternatively, a medium may store information on a chip, such that, when the medium is inserted into a chip reader and/or is otherwise accessed, the account information or similar information may be accessed by the reader. Additionally, or alternatively, a medium may store information in a radio frequency (RF) component (e.g., an RF identifier (RFID) tag or a similar component) associated with a wireless communication technology (e.g., an NFC technology), such that, when the medium is presented near a reader (e.g., a wireless terminal), the account information or similar information may be accessed by the reader wirelessly communicating with the RF component.

In some examples, a terminal (e.g., an ATM terminal, a POS terminal, or the like) may only have a capability to access information associated with one medium at a time when using a magnetic strip reader, a chip reader, or a similar reader, because hardware associated with the terminal may only be able to receive a single medium at any one time. However, a wireless terminal (e.g., an NFC-based terminal), which may receive electronic signals from any nearby RF components, may not be associated with the same hardware limitations as a magnetic strip reader and/or a chip reader, and thus a wireless terminal may be capable of accessing information associated with multiple mediums simultaneously.

Accordingly, when presented with multiple mediums in the context of completing an electronic exchange of information, the terminal may be required to select one of the multiple mediums for completing the electronic exchange of information. For example, if a wireless POS terminal associated with a retail stores receives signals from multiple payment cards during a purchase, the terminal may select one of the multiple cards for completion of the transaction. In some examples, the medium used for the electronic exchange of information may be selected randomly and/or arbitrarily. For example, a medium may be selected that is associated with a first wireless signal received at the wireless terminal. This may result in selecting a medium that a user did not intend to use for the electronic exchange of information, resulting in high power, computing, and network resource consumption for correcting errors associated with the electronic exchange of information. Returning to the example of a wireless terminal at a retail store, the arbitrarily selected medium may be associated with an account that includes an insufficient amount of funds to complete a payment transaction and/or a medium associated with an inadequate spending limit to complete the payment transaction, resulting in a declined transaction and thus additional power, computing, and network resource consumption for processing the transaction using another medium or payment type. Moreover, even if a transaction is not declined, selecting an incorrect medium may result in a payment that is completed using a wrong payment method (e.g., a payment that is executed using a corporate card rather than a personal card), and thus the user may request that the transaction be reversed and reprocessed, resulting in high power, computing, and network resource consumption to complete redundant transactions.

Some techniques and systems described herein enable intelligent selection of a medium, out of multiple mediums presented at a wireless terminal, to be used for processing an electronic exchange of information. In some implementations, an intelligent medium selection system may be associated with a user interface that is capable of receiving information associated with multiple mediums (e.g., multiple cards, such as ATM cards, payment cards, or similar cards, or other mediums, such as tokens, mediums associated with multiple account numbers, mediums associated with multiple identifiers and/or identities, or the like) via a wireless technology, such as an NFC technology or a similar technology. When presented with multiple mediums (e.g., when the intelligent medium selection system receives multiple wireless signals, each associated with a corresponding medium) in the context of an electronic exchange of information, the intelligent medium selection system may identify and/or select a medium to be used to execute the electronic exchange of information. For example, the intelligent medium selection system may perform a lookup of a user profile associated with at least one of the multiple mediums, with the user profile indicating a medium order priority profile associated with the user and/or the mediums (e.g., a hierarchy of which medium is to be selected to complete the electronic exchange of information). The intelligent medium selection system may select a medium based on the medium order priority profile, such as by selecting a medium, of the multiple mediums presented at the wireless terminal, that is associated with a highest priority value in the medium order priority profile. In this way, the intelligent medium selection system may reduce errors associated with medium-based electronic exchanges of information, thereby reducing power, computing, and network resource consumption otherwise associated with erroneous and/or redundant electronic exchanges of information.

Figure 1B:
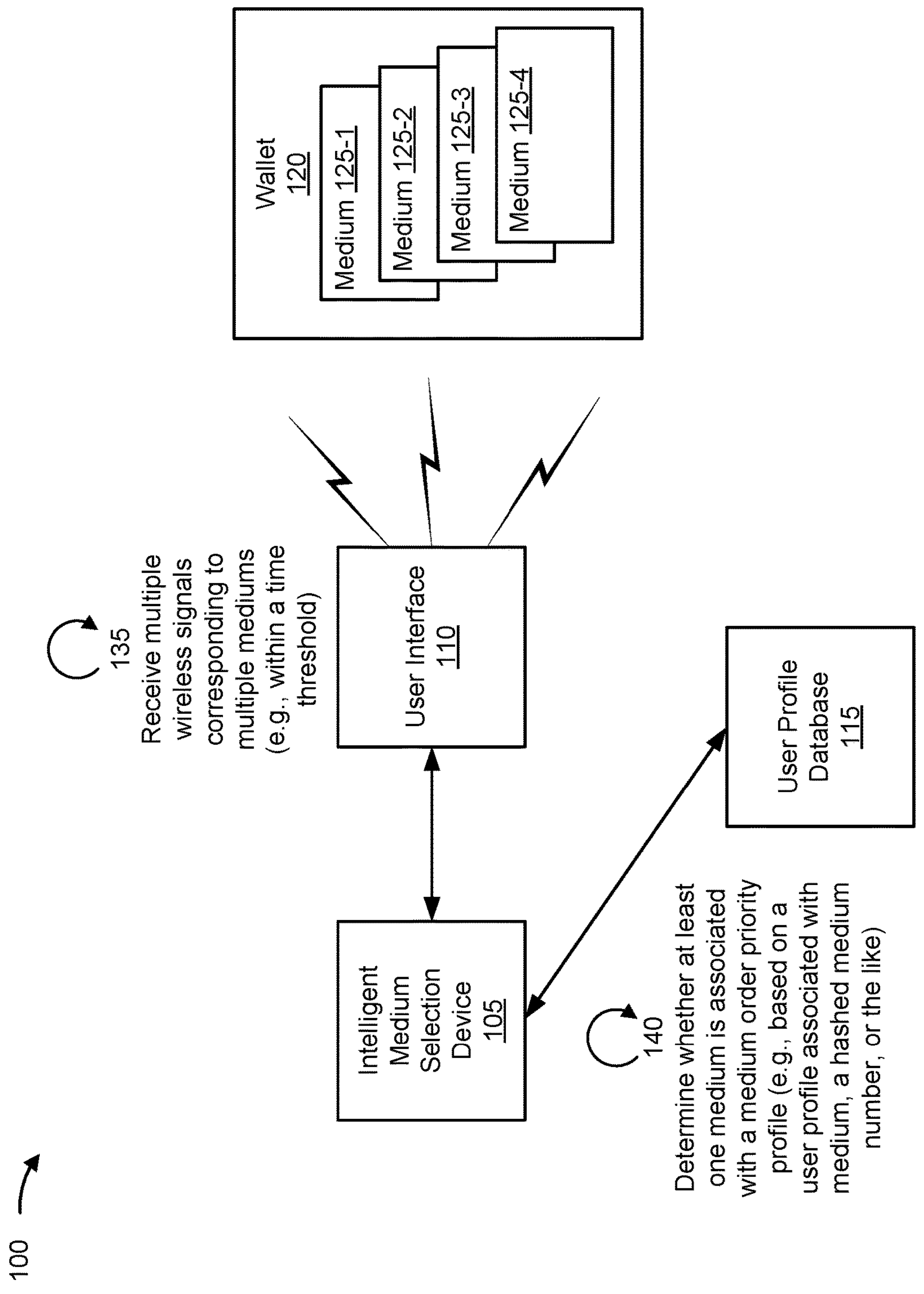
Figure 1C:
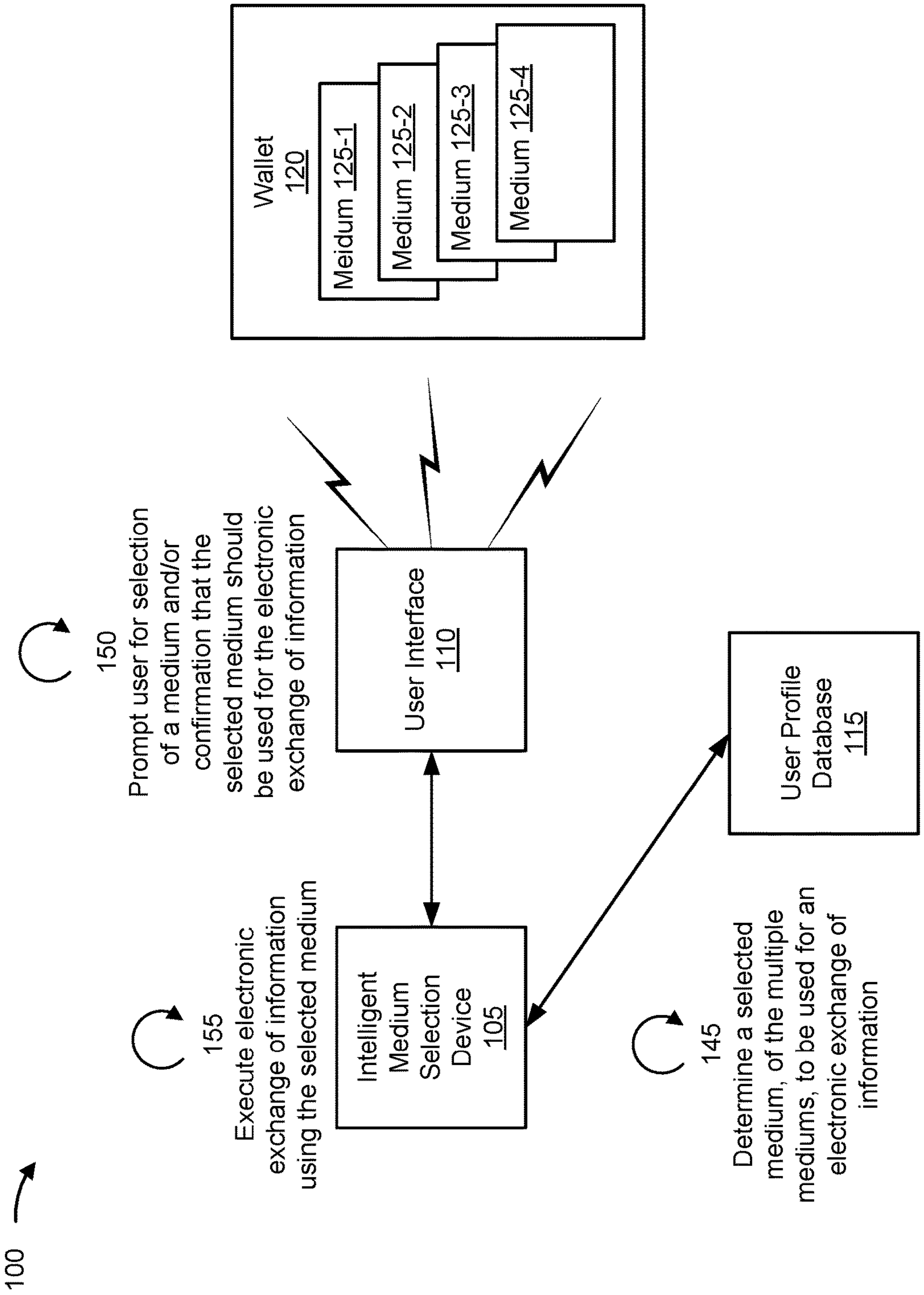

FIGS. 1A-1C are diagrams of an example 100 associated with intelligent selection of a medium at a user interface. As shown in FIGS. 1A-1C, example 100 includes an intelligent medium selection device 105, a user interface 110, and a user profile database 115. In some implementations, the intelligent medium selection device 105, the user interface 110, and/or the user profile database 115 may be in communication with one another. Additionally, or alternatively, in some implementations, two or more of the intelligent medium selection device 105, the user interface 110, and/or the user profile database 115 may be associated with the same device and/or same set of devices. These devices are described in more detail in connection with FIGS. 2 and 3.

As shown in FIG. 1A, the user interface 110 may be configured to wirelessly communicate with one or more components located nearby the user interface 110. For example, the user interface 110 may be a wireless terminal associated with an ATM, a POS terminal, or similar terminal that is capable of communicating with nearby devices using an NFC technology or a similar communication technology. In some implementations, as shown in FIG. 1A, a user may present a wallet 120 or a similar device nearby (e.g., within approximately four centimeters of) the user interface 110 during an electronic exchange of information (e.g., a withdrawal or deposit of funds at an ATM, a purchase or refund at a POS terminal, or a similar transaction and/or electronic exchange of information). The wallet 120 or similar device may hold multiple mediums 125 (shown in FIG. 1A as mediums 125-1 through 125-4) capable of communicating with the user interface 110 using an NFC technology or a similar wireless communication technology. For example, the wallet 120 or similar device may hold multiple cards capable of communicating with the user interface 110 using an NFC technology or a similar wireless communication technology. In some examples, the user interface 110 may be associated with a POS terminal having a tap-to-pay capability, and one or more of the mediums 125 may be cards that support tap-to-pay functionality. In some implementations, the mediums 125 may be associated with bank cards, ATM cards, payment cards (e.g., debit cards, credit cards, or similar payment cards), pre-paid cards (e.g., gift cards), or similar types of transaction cards. Additionally, or alternatively, the mediums 125 may have electronic information stored thereon, such as financial institution information, account information, balance information, or similar information, that may be communicated to the user interface 110 using an NFC technology or a similar wireless communication technology.

In some implementations, the user interface 110 may be capable of receiving user input, such as a phone number, an e-mail address, account information, or similar information, such as for a purpose of identifying a loyalty account, a user profile, and/or similar information associated with a user. For example, in implementations in which the user interface 110 is associated with a POS terminal, at a start of a transaction (e.g., when a user approaches the POS terminal and/or when a first item is scanned at the POS terminal) a user may be prompted to input a phone number, input an email address, input an account number, scan a loyalty card, scan an identification card (e.g., a driver's license or similar identification card), and/or perform a similar procedure in order to identify the user and/or a user account or profile associated with the user. Accordingly, in such implementations, the user interface 110 (and/or the intelligent medium selection device 105, via the user interface 110) may receive user input identifying a user profile associated with the user, as indicated by reference number 130.

As shown in FIG. 1B, and as indicated by reference number 135, in some implementations the user interface 110 and/or the intelligent medium selection device 105 (e.g., via the user interface 110) may receive multiple wireless signals corresponding to the multiple mediums 125 being presented at the user interface 110 (e.g., via a wireless technology, such as an NFC technology or a similar wireless communication technology). More particularly, each wireless signal, of the multiple wireless signals, may correspond to a respective medium 125, of the multiple mediums 125 being presented at the user interface 110. In some implementations, the user interface 110 and/or the intelligent medium selection device 105 may be configured to search for multiple mediums 125 within a certain period of time, sometimes referred to herein as a time threshold. For example, upon detecting a first wireless signal and/or a first medium 125 at the user interface 110, the intelligent medium selection device 105 and/or the user interface 110 may be configured to search for other mediums within a time threshold, such as within the next 200 milliseconds (ms) or within a similar time threshold. In this way, if a user presents the wallet 120 to the user interface 110 (e.g., holds the wallet within approximately four centimeters of the user interface 110), the intelligent medium selection device 105 and/or the user interface 110 may detect the presence of a first medium 125-1 by receiving a wireless signal associated the first medium 125-1. The intelligent medium selection device 105 and/or the user interface 110 may then wait a time threshold (e.g., 200 ms) to see if any additional mediums are present at the user interface 110. In the example shown in FIG. 1B, the user interface 110 may receive three additional wireless signals within the time threshold, corresponding to the second medium 125-2, the third medium 125-3, and the fourth medium 125-4 also being present at the user interface 110.

As further shown in FIG. 1B, and as indicated by reference number 140, the intelligent medium selection device 105 may determine whether at least one medium 125, of the multiple mediums (e.g., mediums 125-1 through 125-4) presented at the user interface 110, is associated with a medium order priority profile. A medium order priority profile (e.g., a card order priority profile) may be an indication of a hierarchy of mediums to be used to execute a electronic exchange of information (e.g., a transaction). In some implementations, the medium order priority profile may be user configurable, such that a user may indicate a preferred order of mediums to be used to execute an electronic exchange of information. For example, returning to the example shown in FIG. 1B, a user may indicate that the first medium 125-1 is associated with a highest priority level, which may be indicative that, if present at the user interface 110, the user wishes for the intelligent medium selection device 105 to select the first medium 125-1 to execute the electronic exchange of information. Moreover, the user may indicate an order of any remaining mediums 125 associated with the user such that, if the first medium 125-1 is not present or otherwise unavailable for the electronic exchange of information, the intelligent medium selection device 105 may select a different medium, in descending order of priority level, to execute the electronic exchange of information. For example, the user may indicate that the second medium 125-2 is associated with a second-highest priority level, that the third medium 125-3 is associated with a third-highest priority level, and that a fourth medium 125-4 is associated with a fourth-highest priority level. In that regard, when executing an electronic exchange of information (e.g., a transaction), the intelligent medium selection device 105 may first use the first medium 125-1 if present and/or available. If the first medium 125-1 is not present and/or available, the intelligent medium selection device 105 may instead select the second medium 125-2 for executing the electronic exchange of information. Similarly, if the second medium 125-2 is not present and/or available, the intelligent medium selection device 105 may select the third medium 125-2 for executing the electronic exchange of information, and if the third medium 125-3 is not present and/or available, the intelligent medium selection device 105 may select the fourth medium 125-4 for executing the electronic exchange of information.

A user may be permitted to update a medium order priority profile. For example, if a user's payment card preferences have changed (e.g., due to a card reaching a spending limit and/or approaching a low-fund limit, due to a user performing business purchases rather than personal purchases, or the like), the user may update the medium order priority profile (e.g., a card order priority profile) to reflect the updated preferences. For example, the user may change a priority order such that the second medium 125-2 has a highest priority level, the third medium 125-3 has the second highest priority level, the fourth medium 125-4 has the third highest priority level, and the first medium 125-1 has the fourth highest priority level (e.g., the user may change a priority level of the first medium 125-1 to associated the first medium 125-1 with a lowest priority level in the medium order priority level in response to the first medium 125-1 approaching a spending limit, or the like).

In some implementations, the medium order priority profile may be associated with a user profile that is associated with a certain entity. For example, in some implementations the user interface 110 may be associated with a financial institution, a retail store, or a similar entity. Moreover, the user may establish a user profile at the financial institution, the retail store, or the similar entity, such as for a purpose of performing online banking, establishing loyalty points with the entity, receiving entity-specific discounts and/or coupons, tracking purchases at the entity, and/or for a similar purpose. When establishing the user profile, the user may be prompted to associate various mediums 125 with the user profile, such as by establishing the medium order priority profile. Additionally, or alternatively, the medium order priority profile and/or a user profile associated with a medium order priority profile may be stored in a database or a similar data structure, such as the user profile database 115 shown in FIG. 1B. In such implementations, determining whether that at least one medium is associated with the medium order priority profile may include performing a lookup (e.g., from the user profile database 115) of a user profile associated with the entity. For example, in implementations in which the user interface 110 is associated with a POS terminal at a retail store, upon initiating a transaction, a user may be prompted to scan a loyalty card and/or enter identifying information (e.g., a phone number, an email address, or the like) in order to identify the user and/or a user profile associated with the user. Moreover, the user profile may include a medium order priority profile stored therein. Accordingly, if the user presents multiple mediums to the user interface 110 (such as mediums 125-1 through 125-4 in the example shown in FIG. 1B), the intelligent medium selection device 105 may determine whether at least one of the mediums 125 is associated with a medium order priority profile by accessing the user profile (e.g., via the user profile database 115) and looking up a corresponding medium order priority profile associated with the user profile.

In some implementations, if a user presenting the multiple mediums 125 at the user interface 110 has not previously identified themselves (e.g., if the user has not entered a phone number, e-mail address, or other identifying information at the user interface 110), the intelligent medium selection device 105 may use identifying information associated with one or more of the mediums 125 in order to determine if the user has established a user profile and/or a medium order priority profile. For example, the intelligent medium selection device 105 may search multiple user profiles (e.g., stored in the user profile database 115) using information associated with at least one medium 125, of the multiple mediums (e.g., mediums 125-1 through 125-4) presented at the user interface 110. For example, the intelligent medium selection device 105 may identify a card number, an account number, and/or similar identifying information associated with at least one medium 125 presented at the user interface 110, and the intelligent medium selection device 105 may search the user profile database 115 or similar database to determine if the card number, account number, and/or similar identifying information is associated with a user profile and/or a medium order priority profile in the user profile database 115. If the intelligent medium selection device 105 identifies a medium order priority profile that includes the card number, the account number, and/or similar identifying information, the intelligent medium selection device 105 may utilize the identified medium order priority profile for selecting a medium 125 to execute the electronic exchange of information, which is described in more detail below.

In some implementations, the intelligent medium selection device 105 may anonymize or otherwise scramble information stored in the user profile database 115 and/or used as an input for searching the user profile database 115. For example, the user profile database 115 may store hashed versions of card numbers, account numbers, and/or similar identifying information associated with mediums stored in the medium order priority profiles stored therein. In such implementations, the intelligent medium selection device 105 may pass card numbers, account numbers, and/or similar identifying information that is wirelessly received from the multiple mediums 125 at the user interface 110 through a hashing function. Accordingly, the intelligent medium selection device 105 may search the user profile database 115 using a hashed version of the card numbers, account numbers, and/or similar identifying information in an effort to locate a matching hashed value in a medium order priority profile.

As shown in FIG. 1C, and as indicated by reference number 145, the intelligent medium selection device 105 may determine, based on determining whether that at least one medium 125 is associated with the medium order priority profile, a selected medium 125, of the multiple mediums (e.g., mediums 125-1 through 125-4), to be used for the electronic exchange of information. For example, in implementations in which a medium order priority profile was identified by the intelligent medium selection device 105 in the operations described above in connection with reference number 140, the intelligent medium selection device 105 may select a medium 125 associated with a highest priority level in the identified medium order priority profile. In that regard, a user who has several mediums 125 (e.g., several cards) in a wallet 120 or a similar holder may present all the mediums 125 at a user interface 110 and indicate, via the information pre-stored in the medium order priority profile, which medium 125 should be used for a given transaction without having to separate and/or remove a medium 125 from the wallet 120 in order to present only that medium 125 at the user interface 110.

In some implementations, the intelligent medium selection device 105 may not be able to identify a medium order priority profile associated with a user or any of the mediums 125 presented at a user interface 110. In such implementations, the intelligent medium selection device 105 may select a medium 125 to be used for the electronic exchange of information using a different criteria (e.g., using criteria not associated with a medium order priority profile). For example, upon determining that no mediums are associated with a medium order priority profile, the intelligent medium selection device 105 may select a medium 125 that is associated with an entity associated with the intelligent medium selection device 105 and/or the user interface 110. For example, in implementations in which the intelligent medium selection device 105 and/or the user interface 110 is associated with a financial institution, such as implementations in which the intelligent medium selection device 105 and/or the user interface 110 is associated with an ATM, the intelligent medium selection device 105 may select a medium 125, of multiple mediums presented at the user interface 110, that was issued by the financial institution. In some other implementations, such as in implementations in which the intelligent medium selection device 105 and/or the user interface 110 is associated with a retail store (e.g., when the user interface is a POS terminal at a retail store), the intelligent medium selection device 105 may select a medium 125, of multiple mediums presented at the user interface 110, that is associated with the retail store (e.g., a medium that was issued by the retail store and/or that provides rewards to a user when used at the retail store).

In some implementations, the intelligent medium selection device 105 may identify that a medium 125 is associated with a particular entity based on a bank identification number (BIN) (sometimes referred to as a BIN code) associated with the medium 125. A BIN code may refer to an initial sequence of four to six numbers that appears on a medium 125. The BIN code may be used to identify the medium 125's issuing bank or other financial institution. In that regard, in implementations in which the user and/or the mediums 125 are not associated with a medium order priority profile, the intelligent medium selection device 105 may determine whether any of the mediums 125 include a BIN code associated with the entity associated with the intelligent medium selection device 105 and/or the user interface 110, and, if so, the intelligent medium selection device 105 may select that medium 125 to be used to execute the electronic exchange of information. For example, in implementations in which the intelligent medium selection device 105 and/or the user interface 110 is associated with a financial institution, such as an ATM at a financial institution, the intelligent medium selection device 105 may select a medium 125 that includes a BIN code associated with the financial institution. Similarly, in implementations in which the intelligent medium selection device 105 and/or the user interface 110 is associated with a retail store, such as a POS terminal at a retail store, the intelligent medium selection device 105 may select a medium 125 that includes a BIN code associated with the retail store (e.g., a credit card issued by the retail store).

In some other implementations, such as implementations in which the user and/or the multiple mediums 125 are not associated with a medium order priority profile and/or in which none of the mediums 125 presented at the user interface 110 are associated with the entity associated with the intelligent medium selection device 105 and/or the user interface 110, the intelligent medium selection device 105 may select a medium 125 that is associated with a strongest wireless signal, of the multiple wireless signals received at the user interface 110. Put another way, in such implementations signal strength may be used by the intelligent medium selection device 105 as a proxy for a priority selection, because a medium 125 that has a highest signal strength may be a medium 125 that a user keeps in an outside pocket or sleeve of the wallet 120 and/or may be a medium that is maintained in a location that is easily accessible the user. Accordingly, in such implementations, the intelligent medium selection device 105 may compare signal strengths associated with each of the received wireless signals and select the medium 125 associated with the strongest wireless signal.

As indicated by reference number 150, in some implementations the intelligent medium selection device 105, via the user interface 110, may prompt a user for information related to selecting a medium 125 for execution of the electronic exchange of information. For example, if the intelligent medium selection device 105 is unable to determine a highest priority medium 125 using one or more of the operations described above, the intelligent medium selection device 105 may prompt the user (e.g., via the user interface 110) to select one of the multiple mediums 125 for execution of the electronic exchange of information. For example, the intelligent medium selection device 105 may cause an indication of each detected medium 125 to be displayed on the user interface 110, and a user may thus select which of the multiple mediums 125 should be used to execute the electronic exchange of information. Put another, the operations described above in connection with reference number 145 (e.g., determining the selected medium 125 to be used for the electronic exchange of information) may be based on an indication of the selected medium received by the intelligent medium selection device 105, and, more particularly, received via the user interface 110.

Additionally, or alternatively, the intelligent medium selection device 105 may prompt the user to confirm that a medium 125 that is selected using any of the operations described above should be used to execute the electronic exchange of information. For example, in some implementations the intelligent medium selection device 105 may select a medium 125 to be used for the electronic exchange of information (such as by referencing a medium order priority profile associated with the user and/or one of the mediums 125, by determining that a BIN code associated with one of the mediums 125 is associated with an entity associated with the intelligent medium selection device 105 and/or the user interface 110, by identifying a medium 125 associated with a strongest wireless signal, or the like), and may display an indication of the selected medium 125 via the user interface 110. The user may then be prompted to confirm that the selected medium 125 should be used for executing the electronic exchange of information.

As indicated by reference number 155, the intelligent medium selection device 105 may execute the electronic exchange of information using selected medium 125. For example, in implementations in which the intelligent medium selection device 105 and/or the user interface 110 is associated with a financial institution, such as when the intelligent medium selection device 105 and/or the user interface 110 is associated with an ATM, the intelligent medium selection device 105 may execute a financial transaction (e.g., a withdrawal, a deposit, a balance check, or the like) using the selected medium 125, which, in this example, may be a bank card, an ATM card, another card, or a similar medium. Similarly, in implementations in which the intelligent medium selection device 105 and/or the user interface 110 is associated with a retail store, such as when the intelligent medium selection device 105 and/or the user interface 110 is associated with a POS terminal, the intelligent medium selection device 105 may execute a retail transaction (e.g., a purchase transaction, a refund transaction, or the like) using the selected medium 125, which, in this example, may be a payment card (e.g., a credit card, a debit card, a gift card, or a similar payment card). In this way, the intelligent medium selection device 105 may select an appropriate medium 125 to be used for an electronic exchange of information, which may reduce errors associated with medium-based electronic exchanges of information and thus may reduce power, computing, and network resource consumption otherwise associated with erroneous and/or redundant electronic exchanges of information.

As indicated above, FIGS. 1A-1C are provided as an example. Other examples may differ from what is described with regard to FIGS. 1A-1C.

Figure 2:
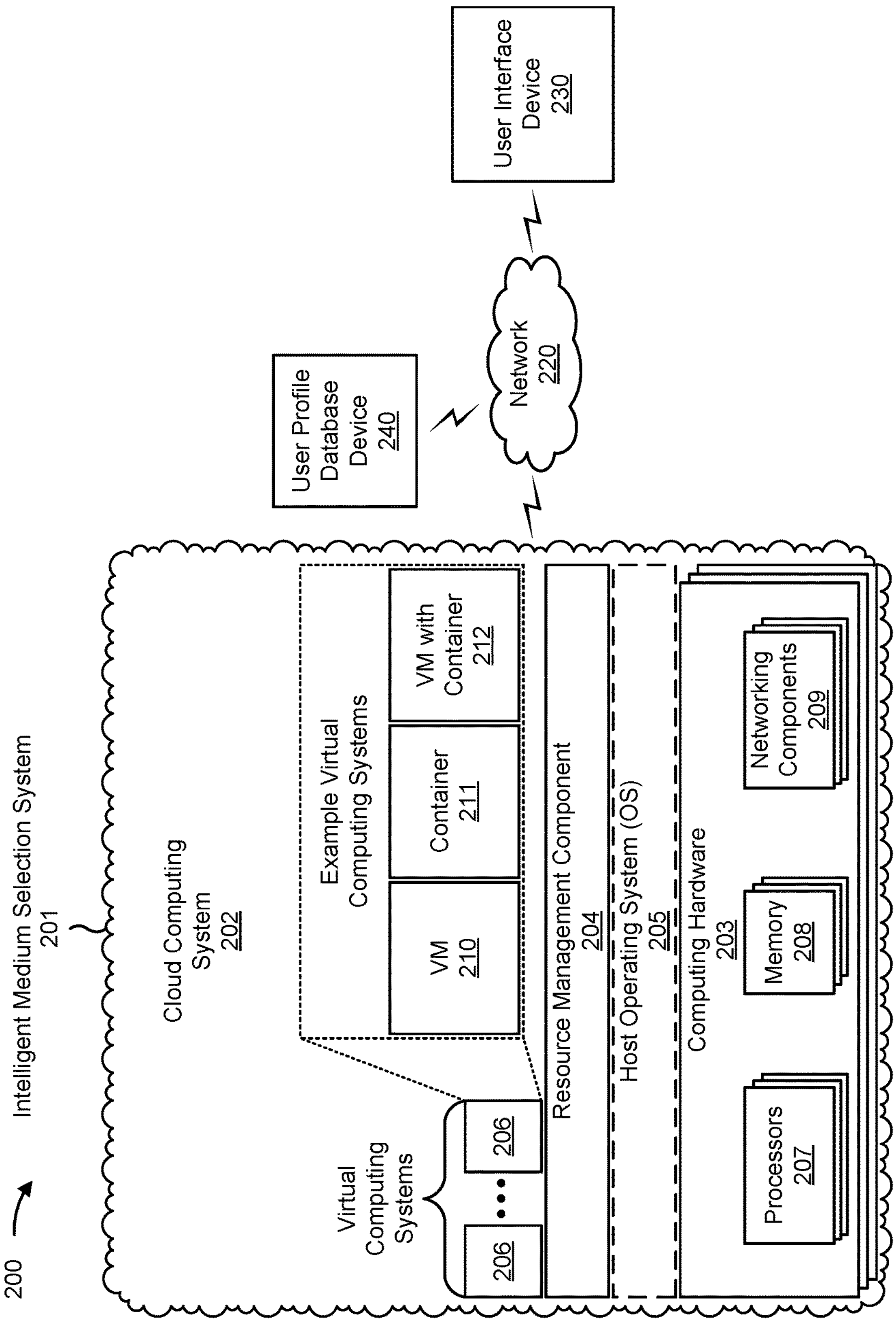
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include an intelligent medium selection system 201, which may include one or more elements of and/or may execute within a cloud computing system 202. The cloud computing system 202 may include one or more elements 203-212, as described in more detail below. In some implementations the cloud computing system 202 may include and/or may be associated with an intelligent medium selection device (e.g., intelligent medium selection device 105). For example, one or more of the virtual computing systems 206 described in more detail below may correspond to the intelligent medium selection device 105. As further shown in FIG. 2, environment 200 may include a network 220, a user interface device 230 (e.g., user interface 110), and/or a user profile database device 240 (e.g., user profile database 115). In some implementations, one or more of the user interface device 230 and the user profile database device 240 may be part of the cloud computing system 202. For example, in some implementations, one or more of the virtual computing systems 206 described in more detail below may correspond to the user interface device 230 and/or the user profile database device 240. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the intelligent medium selection system 201 may include one or more elements 203-212 of the cloud computing system 202, may execute within the cloud computing system 202, and/or may be hosted within the cloud computing system 202, in some implementations, the intelligent medium selection system 201 may not be cloud-based (e.g., may be implemented outside of a cloud computing system) or may be partially cloud-based. For example, the intelligent medium selection system 201 may include one or more devices that are not part of the cloud computing system 202, such as device 300 of FIG. 3, which may include a standalone server or another type of computing device. The intelligent medium selection system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The user interface device 230 may include a wireless terminal or a similar device capable of wirelessly receiving information, such as information associated with one of the mediums 125 described above in connection with FIG. 1. The user interface device 230 may be associated with an NFC technology or a similar wireless communication technology configured to wirelessly communicate with one or more mediums (e.g., bank cards, ATM cards, payment cards such as debit cards and/or credit cards, gift cards, or similar cards, tokens, mediums associated with account numbers, mediums associated with identifiers and/or identities, or similar mediums). In some implementations, the user interface device 230 may include a user input device, such as a keyboard, a touch screen, a camera, a microphone, or a similar user input device. For example, the user interface device 230 may be capable of presenting information for confirmation and/or selection by a user, such as an indication of a selected medium to be used in connection with an electronic exchange of information and/or an indication of multiple candidate mediums to be used from the electronic exchange of information for selection by a user, and the user interface device 230 may thus be capable of receiving user input confirming a selected medium to be used for the electronic exchange of information and/or indicating one of multiple candidate mediums to be used for the electronic exchange of information.

The user profile database device 240 may include a device capable of storing user profile information, such as medium order priority profile information, in a database or a similar data set. In some implementations, the user profile database device 240 may be associated with an entity, such as a financial institution, a retail store, or a similar entity. For example, the user profile database device 240 may be a backend server associated with an entity. Additionally, or alternatively, the user profile database device 240 may be capable of obscuring certain information stored thereon. For example, the user profile database device 240 may be capable of performing a hashing function and/or storing hashed information thereon, such as hashed versions of account numbers, medium numbers, or similar information.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
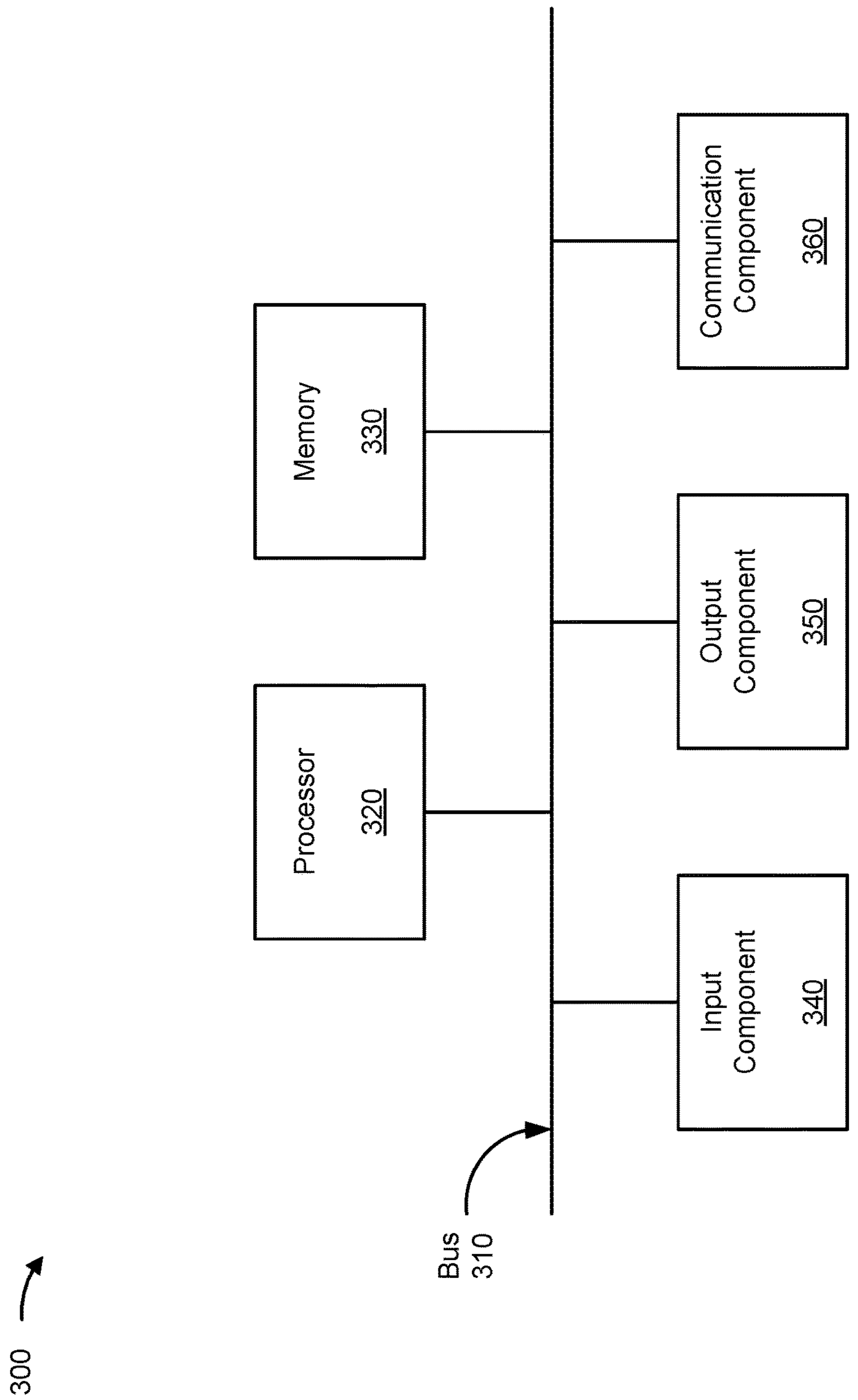
FIG. 3 is a diagram of example components of a device associated with intelligent selection of a medium at a user interface, in accordance with some embodiments of the present disclosure.

FIG. 3 is a diagram of example components of a device 300 associated with intelligent selection of a medium at a user interface. The device 300 may correspond to the intelligent medium selection device 105, the user interface 110 and/or the user interface device 230, the user profile database 115 and/or the user profile database device 240, the intelligent medium selection system 201, and/or the cloud computing system 202. In some implementations, the intelligent medium selection device 105, the user interface 110 and/or the user interface device 230, the user profile database 115 and/or the user profile database device 240, the intelligent medium selection system 201, and/or the cloud computing system 202 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
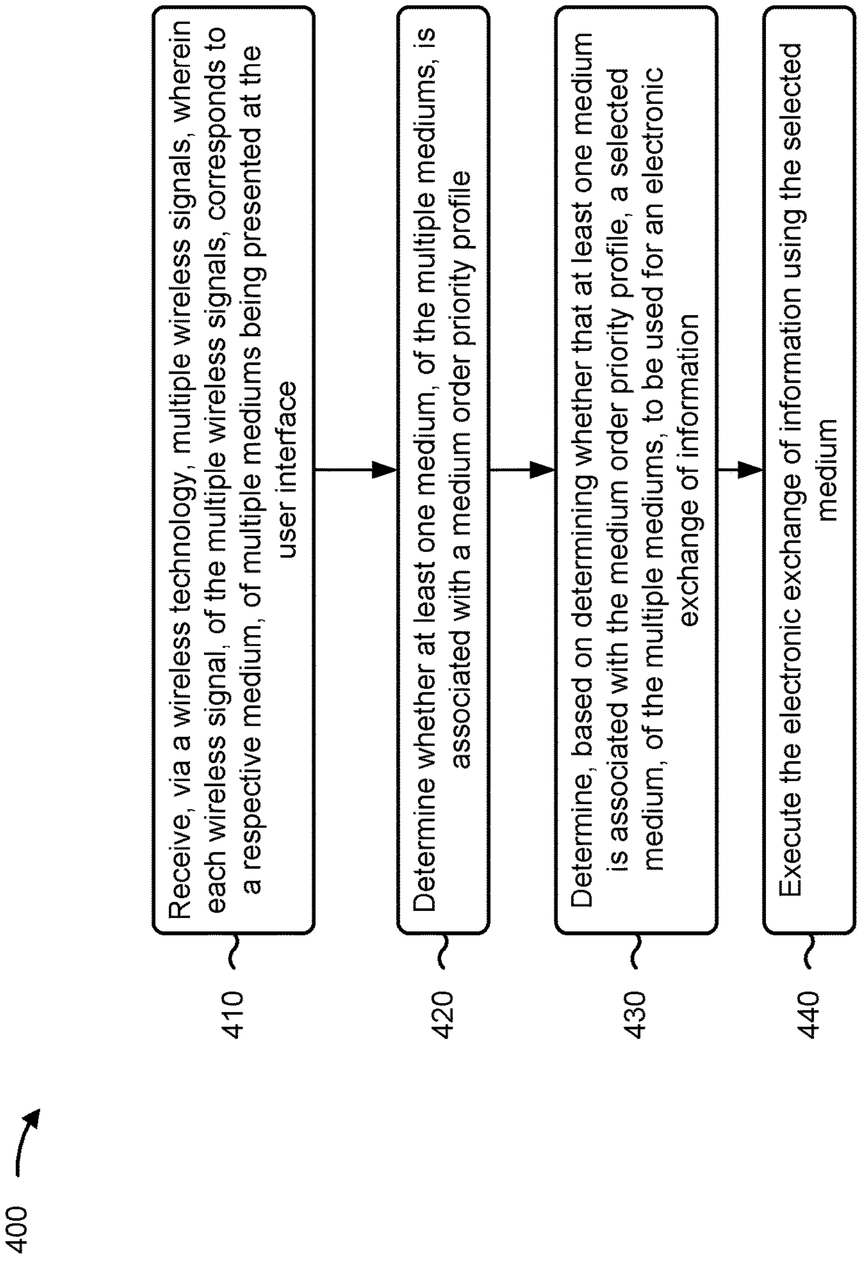
FIG. 4 is a flowchart of an example process associated with intelligent selection of a medium at a user interface, in accordance with some embodiments of the present disclosure.

FIG. 4 is a flowchart of an example process 400 associated with intelligent selection of a medium at a user interface. In some implementations, one or more process blocks of FIG. 4 may be performed by the intelligent medium selection device 105. In some implementations, one or more process blocks of FIG. 4 may be performed by another device or a group of devices separate from or including the intelligent medium selection device 105, such as the intelligent medium selection system 201, the cloud computing system 202, the user interface device 230 (e.g., user interface 110), and/or the user profile database device 240 (e.g., the user profile database 115). Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving multiple wireless signals, wherein each wireless signal, of the multiple wireless signals, corresponds to a respective medium, of multiple mediums being presented at the user interface (block 410). For example, the intelligent medium selection device 105 (e.g., using processor 320, memory 330, input component 340, and/or communication component 360) may receive multiple wireless signals, wherein each wireless signal, of the multiple wireless signals, corresponds to a respective medium, of multiple mediums being presented at the user interface, as described above in connection with reference number 135 of FIG. 1B. As an example, the intelligent medium selection device 105 may be associated with a wireless POS terminal at a retail store, and the wireless POS terminal may receive multiple wireless signals corresponding to multiple payment mediums being wirelessly presented at the wireless POS terminal.

As further shown in FIG. 4, process 400 may include determining whether at least one medium, of the multiple mediums, is associated with a medium order priority profile (block 420). For example, the intelligent medium selection device 105 (e.g., using processor 320 and/or memory 330) may determine whether at least one medium, of the multiple mediums, is associated with a medium order priority profile, as described above in connection with reference number 140 of FIG. 1B. As an example, when multiple payment mediums are presented at a wireless POS terminal, the intelligent medium selection device 105 may determine whether a user (which may be identified via a loyalty account login or similar login information received at the POS terminal) has established a medium order priority profile with the retail store and/or whether one or more of the medium numbers are associated with a medium order priority profile.

As further shown in FIG. 4, process 400 may include determining, based on determining whether that at least one medium is associated with the medium order priority profile, a selected medium, of the multiple mediums, to be used for an electronic exchange of information (block 430). For example, the intelligent medium selection device 105 (e.g., using processor 320 and/or memory 330) may determine, based on determining whether that at least one medium is associated with the medium order priority profile, a selected medium, of the multiple mediums, to be used for an electronic exchange of information, as described above in connection with reference number 145 of FIG. 1C. As an example, when the intelligent medium selection device 105 identifies that a medium order priority profile has been established by a user, the intelligent medium selection device 105 may select a medium, of the multiple mediums presented at the user interface, that is associated with a highest priority level in the medium order priority profile.

As further shown in FIG. 4, process 400 may include executing the electronic exchange of information using the selected medium (block 440). For example, the intelligent medium selection device 105 (e.g., using processor 320 and/or memory 330) may execute the electronic exchange of information using the selected medium, as described above in connection with reference number 155 of FIG. 1C. As an example, when the intelligent medium selection device 105 is associated with a retail store, the intelligent medium selection device 105 may complete a purchase transaction using payment information associated with a selected payment card (e.g., a payment card having a highest priority level of all the cards presented at the wireless POS terminal).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for processing multiple communications at a wireless terminal device, the system comprising:

one or more memories; and one or more processors, communicatively coupled to the one or more memories, configured to:

receive, at the wireless terminal device and via wireless communications, multiple wireless signals, wherein each wireless signal of the multiple wireless signals corresponds to a respective wireless communication device of a plurality of wireless communication devices;

determine whether at least one wireless communication device of the plurality of wireless communication devices is associated with an order priority profile based on performing a lookup of a profile;

determine signal strength associated with the multiple wireless signals;

select, based on determining whether the at least one wireless communication of the plurality of wireless communication devices is associated with the order priority profile and based on determining the signal strength, a wireless communication device of the plurality of wireless communication devices, to be used for an electronic exchange of information; and execute the electronic exchange of information using the selected wireless communication device.

2. The system of claim 1, wherein the one or more processors, to receive the multiple wireless signals, are configured to search for the multiple wireless signals within a time threshold.

3. The system of claim 1, wherein the one or more processors, to determine whether the at least one wireless communication is associated with the order priority profile, are configured to search, using information associated with at least one user profile of multiple user profiles, wherein each of the multiple user profiles is associated with a corresponding order priority profile.

4. The system of claim 3, wherein the one or more processors, to search the multiple user profiles, are configured to pass the information associated with the at least one wireless communication device through a hashing function.

5. The system of claim 1, wherein the one or more processors are further configured to receive, at the wireless terminal device, information confirming that the selected wireless communication device should be used for the electronic exchange of information.

6. The system of claim 1, wherein the wireless terminal device is associated with one of an automated teller machine (ATM) or a point of sale terminal, and wherein the selected communication device is associated with one of an ATM device or a payment device.

7. A method for selecting a wireless communication at a wireless device, comprising:

receiving, by the wireless device and via a wireless technology, multiple wireless signals, wherein each wireless signal, of the multiple wireless signals, corresponds to a respective wireless communication device of a plurality of wireless communication devices;

determining, by the wireless device, whether at least one wireless communication device of the plurality of wireless communication devices, is associated with an order priority profile based on performing a lookup of a profile;

determining, based on determining whether that the at least one wireless communication device is associated with the order priority profile and based on determining a signal strength associated with a selected wireless communication device of the plurality of wireless communication devices, to be used for an electronic exchange of information; and executing, by the wireless device, the electronic exchange of information using the selected wireless communication device.

8. The method of claim 7, wherein receiving the multiple wireless signals comprises searching for the multiple wireless signals within a time threshold.

9. The method of claim 7, wherein the wireless device is associated with an entity, and wherein determining whether the at least one wireless communication device is associated with the order priority profile includes looking up a user profile associated with the entity that indicates the order priority profile.

10. The method of claim 7, wherein determining whether the at least one wireless communication device is associated with the order priority profile includes searching, using information associated with at least one of multiple user profiles, wherein each of the multiple user profiles is associated with a corresponding order priority profile.

11. The method of claim 10, wherein searching the multiple user profiles includes passing the information associated with the at least one wireless communication device through a hashing function.

12. The method of claim 7, further comprising receiving, by the wireless device, information confirming that the selected wireless communication device should be used for the electronic exchange of information.

13. The method of claim 7, wherein determining whether the at least one wireless communication device is associated with the order priority profile includes determining that no wireless communications are associated with the order priority profile, and wherein determining the selected wireless communication device to be used for the electronic exchange of information is based on the selected wireless communication device being associated with an entity associated with the wireless device.

14. The method of claim 13, further comprising determining that the selected wireless communication is associated with the entity based on a bank identification number associated with the selected wireless communication device.

15. The method of claim 7, wherein determining whether the at least one wireless communication device is associated with the order priority profile includes determining that none of the plurality of communication devices are associated with the order priority profile, and wherein determining the selected wireless communication device to be used for the electronic exchange of information is based on the selected communication device being associated with a strongest wireless signal, of the multiple wireless signals.

16. The method of claim 7, wherein determining whether the at least one wireless communication device is associated with the order priority profile includes determining that none of the plurality of wireless communication devices are associated with the order priority profile, and wherein determining the selected wireless communication device to be used for the electronic exchange of information is based on an indication of the selected wireless communication device received by the wireless device.

17. A non-transitory computer-readable medium storing a set of instructions, the set of instructions comprising:

one or more instructions that, when executed by one or more processors of a wireless terminal, cause the wireless terminal to:

receive multiple wireless signals, wherein each wireless signal, of the multiple wireless signals, corresponds to a respective transaction card, of multiple transaction card devices;

determine whether at least one transaction card, of the multiple transaction card devices, is associated with a card order priority profile;

determine signal strength associated with the multiple wireless signals;

determine, based on determining whether that at least one transaction card is associated with the card order priority profile and based on determining the signal strength of the multiple wireless signals, a selected transaction card, of the multiple transaction card devices, to be used for a transaction; and execute the transaction using the selected transaction card.

18. The non-transitory computer-readable medium of claim 17, wherein the wireless terminal is associated with an entity, and wherein determining whether that at least one transaction card is associated with the card order priority profile includes looking up a user profile associated with the entity that indicates the card order priority profile.

19. The non-transitory computer-readable medium of claim 17, wherein determining whether that at least one transaction card is associated with the card order priority profile includes searching, using information associated with at least one transaction card, of the multiple transaction card devices, multiple user profiles, and wherein each of the multiple user profiles is associated with a corresponding card order priority profile.

20. The system of claim 1, wherein the wireless communications includes wireless communications protocols that are associated with at least one of near field communications (NFC), radio frequency (RF) components, RF identifier (RFID) tags, or other proximity wireless communications technologies.

* * * * *